United States Patent [19]

Wu et al.

[11] Patent Number: 6,089,520
[45] Date of Patent: Jul. 18, 2000

[54] SWIVEL BASE STRUCTURE

[75] Inventors: Wei-Chung Wu; Tsung Jung Hsu, both of Taipei, Taiwan

[73] Assignee: Mag Technology Co., Ltd., Taiwan

[21] Appl. No.: 08/709,464

[22] Filed: Sep. 3, 1996

[51] Int. Cl.[7] .................................................. A47G 29/00
[52] U.S. Cl. ........................................ 248/371; 248/923
[58] Field of Search ........................... 248/371, 919–923, 248/349.1, 558

[56] References Cited

U.S. PATENT DOCUMENTS

| | | |
|---|---|---|
| 4,554,590 | 11/1985 | Chelin et al. . |
| 5,024,415 | 6/1991 | Purens ..................................... 248/923 |
| 5,145,134 | 9/1992 | Hashimoto et al. ................. 248/371 X |
| 5,398,903 | 3/1995 | Cho ..................................... 248/921 X |
| 5,465,936 | 11/1995 | Wang ..................................... 248/371 |
| 5,588,625 | 12/1996 | Beak ..................................... 248/371 |

*Primary Examiner*—Robert Canfield
*Attorney, Agent, or Firm*—Ostrolenk, Faber, Gerb & Soffen, LLP

[57] ABSTRACT

A swivel base includes a stationary bottom support to be placed on for example a desk and a movable tray movably supported on the fixed bottom support to support thereon for example a monitor. The bottom support has a circular wall having an inclined inner face and the movable tray has a concave member corresponding to and slidably supported on the inclined face. A post located at center of a recess defined by the circular wall with an expanded retaining member fixed thereon. An elongated slot is provided on the concave member and has an widened section to receive the penetration of the retaining member for retaining the post within the slot in a movable manner and to allow the movable tray to rotate about the post. A stop block is provided within the recess defined by the circular wall and a corresponding rib is provided on the underside of the concave member to be contactable with the stop block for limiting the rotation of the movable tray about the post. A cantilever type, resilient plate having a side lug formed on a free end thereof is formed on the inclined face to be depressible by the rib. The rib has an L-shaped paw and the side lug of the resilient plate has an inverted L-shaped catch engageable with the L-shaped paw to prevent the movably tray from disengaging from the bottom support.

2 Claims, 4 Drawing Sheets

SWIVEL BASE STRUCTURE

FIELD OF THE INVENTION

The present invention relates generally to a swivel structure and in particular to a swivel base for supporting a computer monitor.

BACKGROUND OF THE INVENTION

Computer monitors are usually provided with a swivel base to allow the monitor screen to be oriented toward any desired direction. One of the monitor swivel bases that is available in the market comprises a three-piece construction. Such a three-piece swivel base, although working well, has a disadvantage of being too complicated to be manufactured in a labor- and cost-effective manner. Further, the three-piece structure requires at least three pieces of parts. This increases the warehousing cost.

Thus, a two-piece swivel base or rotatable bracket was developed, such as U.S. Pat. No. 5,465,936 and Taiwan patent publication No. 234595 which corresponds to the '936 U.S. patent of which an exploded perspective view is shown in FIG. 4 of the attached drawings. The rotatable bracket comprises a base plate 10 and a top plate 20 to be rotatably engaged on the base plate 10. A hemispherical recess 11 is formed on the base plate 10 with two grooves 13 defined thereon. A boss 14 extends upward from a center point of the recess 11 with a plurality of wings radially extending from the boss 14 at a distance from the recess 11. A post 15 further extends upward from the boss 14. An annular wall 12 provided on the base plate 10 surrounds the recess 11.

The top plate 20 comprises a concave section 24 corresponding to the recess 11 and having an elongated hole 22 and a square hole 23 in communication with each other formed thereon for fitting onto the distance between the wings and the surface of the recess 11 and thus mounting the top plate 20 on the base plate 10. A hook 21 with flat head 211 that defines a semi-circular cutout 212 is provided to shield the square hole 23 for positioning and retaining purpose. L-shaped ears 25 are provided on the top plate 20 for engaging a computer monitor (not shown).

This conventional two-piece swivel base structure has several disadvantages, such as:

(1) In positioning the top plate 20 relative to the base plate 10, the semi-circular cutout 212 is brought to contact the post 15 and if an un-expected great force is applied thereto, the hook 21 on which the cutout 212 is formed may be damaged.

(2) The configuration of the hook 21 that has the cutout 212 is difficult to molded.

(3) In dismounting the top plate 20 from the base plate 10, the flat head 211 has to be manually deformed and the design of the conventional structure may cause damage to the user's fingers and the hook 21.

Thus, it is desirable to have a two-piece swivel base structure which is simple in structure so as to overcome the drawback associated with the three-piece structure and which also overcomes the disadvantages of the prior art two-piece structure.

SUMMARY OF THE INVENTION

It is therefore an object of the present invention to provide a monitor swivel base which comprises a two-piece structure so as to simplify the overall structure and cut down the number of parts and thus the cost.

It is another object of the present invention to provide a two-piece swivel base which comprises an improved design of the retaining mechanism for preventing the two parts of the swivel base from accidently disengaging from each other, such retaining mechanism being more flexible and tougher so as not to be damaged during the relative rotation or the mounting/dismounting process.

It is a further object of the present invention to provide a two-piece swivel base wherein the retaining mechanism comprises a paw-and-catch pair which engages each other to prevent the two parts of the swivel base from being forcibly detached from each other.

To achieve the above objects, there is provided a swivel base comprising a stationary bottom support to be placed on for example a desk and a movable tray movably supported on the fixed bottom support to support thereon for example a monitor. The bottom support has a circular wall having an inclined inner face and the movable tray has a concave member corresponding to and slidably supported on the inclined face. A post located at center of a recess defined by the circular wall with an expanded retaining member fixed thereon. An elongated slot is provided on the concave member and has an widened section to receive the penetration of the retaining member for retaining the post within the slot in a movable manner and to allow the movable tray to rotate about the post. A stop block is provided within the recess defined by the circular wall and a corresponding rib is provided on the underside of the concave member to be contactable with the stop block for limiting the rotation of the movable tray about the post. A cantilever type, resilient plate having a side lug formed on a free end thereof is formed on the inclined face to be depressible by the rib. The rib has an L-shaped paw and the side lug of the resilient plate has an inverted L-shaped catch engageable with the L-shaped paw to prevent the movably tray from disengaging from the bottom support.

These and other objects and advantages of the present invention will become more apparent from a consideration of the following detailed description of a preferred embodiment thereof, when read in conjunction with the accompanying drawings, wherein:

DETAILED DESCRIPTION OF THE PREFERRED EMBODIMENT

Figure 1:
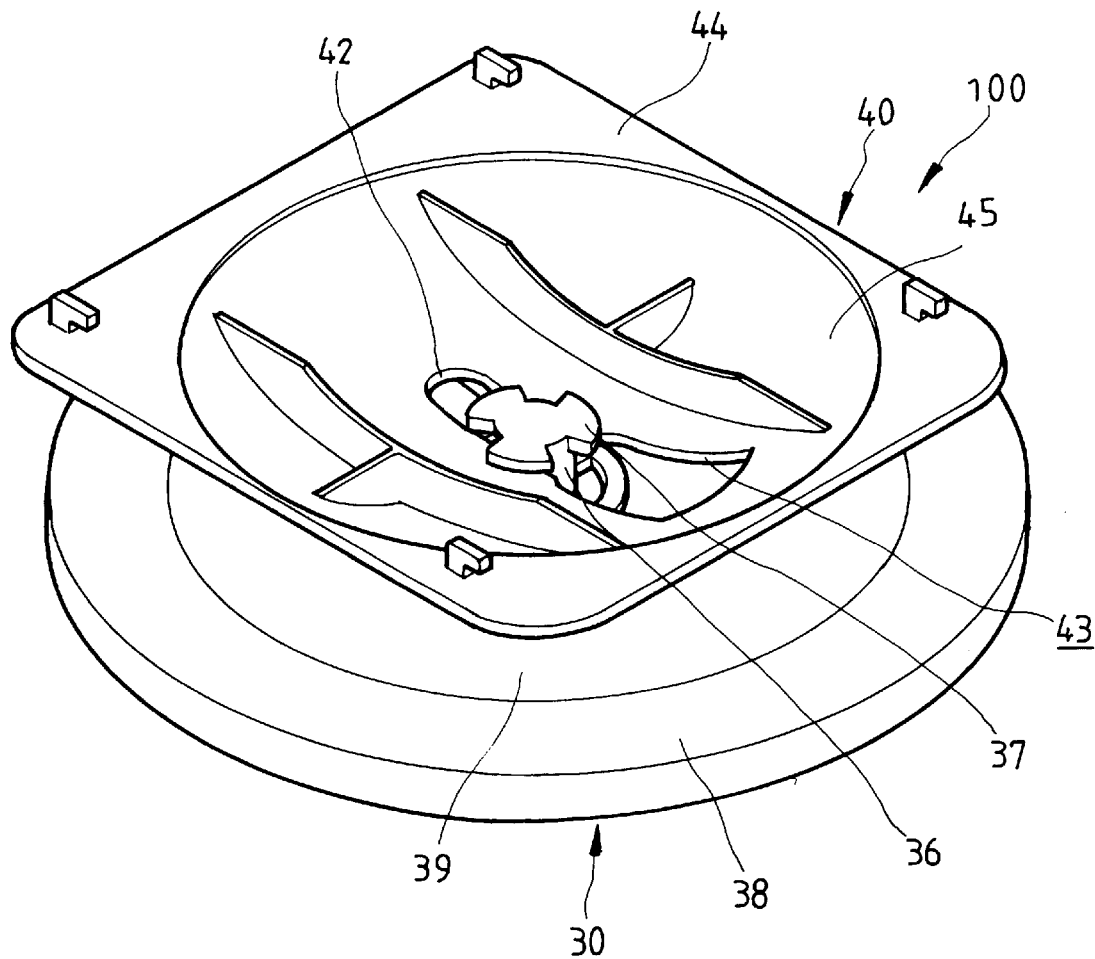
FIG. 1 is a perspective view showing a swivel base constructed in accordance with the present invention.

Referring to the drawings and in particular to FIG. 1, wherein a swivel base, particularly a swivel base for supporting a computer monitor, constructed in accordance with the present invention, generally designated with the reference numeral 100, is shown, the swivel base 100 has a two-piece structure comprising a stationary bottom support 30 to be positioned on for example a desk (not shown) and a movable tray 40 movably supported on the stationary bottom support 30 to support thereon for example a computer monitor (not shown).

Figure 2:
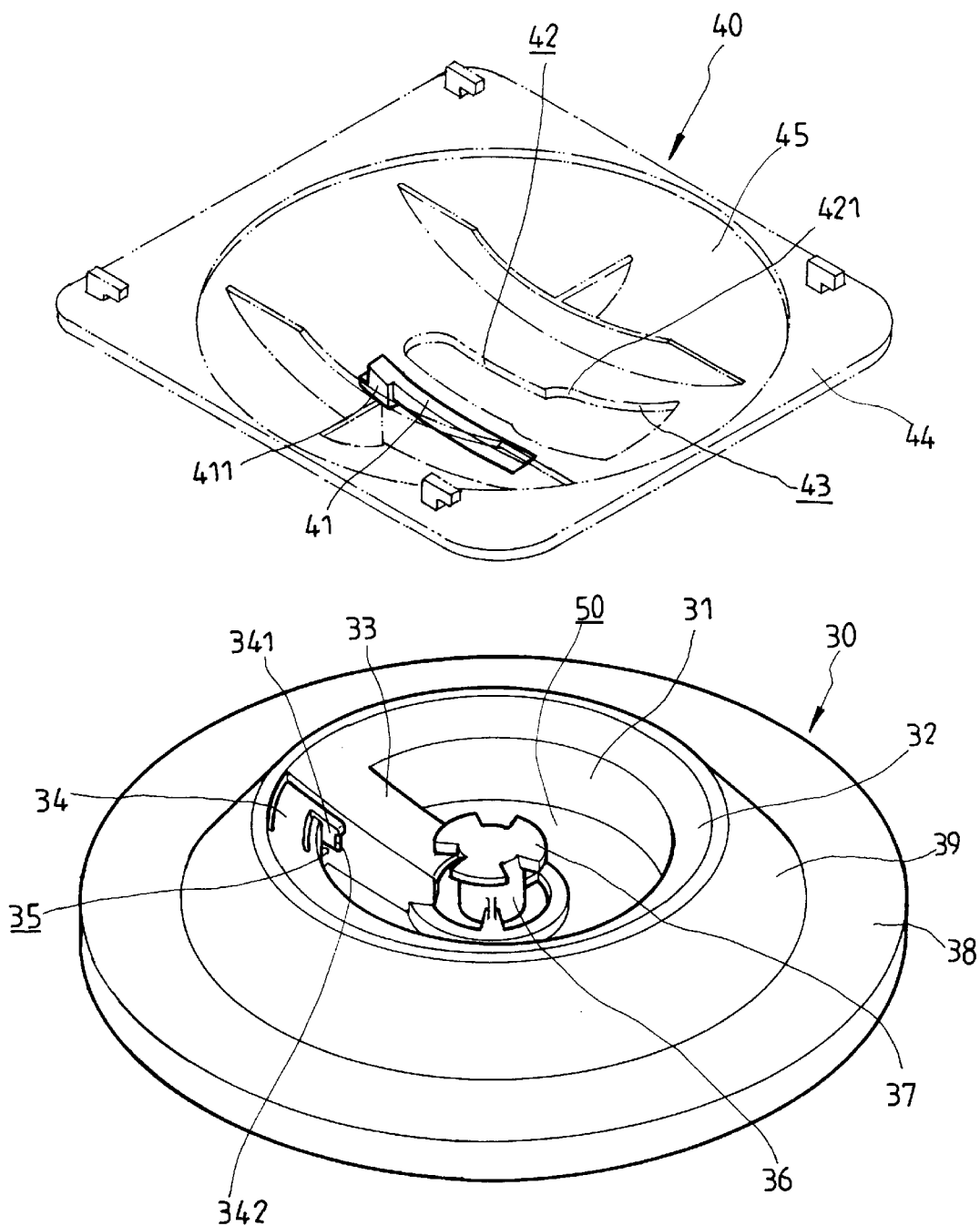
FIG. 2 is an exploded perspective view showing the swivel base wherein the movable tray of the swivel base is shown in phantoms with the underside structure thereof shown in solid line to more clearly illustrate the underside structure.

The stationary bottom support 30 which is more clearly shown in FIG. 2 comprises a circular base body 38 having a raised circular wall 39 formed thereon. Although it is shown that the base body 38 is circular, it is possible to take other shapes, such as rectangle as is more prevailing in the art of computer. The circular wall 39 is preferably concentric with the circular base body 38 for aesthetic purpose and defines therein a recess 50 surrounded by the wall 39. The wall 39 defines a ring-like inclined inner face 32 which is concave substantially corresponding to the curvature of a sphere and a substantially vertical inner face 31 connecting between the inclined face 32 and the bottom of the recess 50. Preferably, the inclined face 32 is a ring-like segment taken from the sphere.

A post 36, that is spaced from the circular wall 39, extends upwards from the center of the recess 50 with a retaining member 37 formed on top end of the post 36. The retaining member 37 may be composed of a plurality of blades extending radially outward as shown in the drawings, or alternatively, the retaining member 37 may comprise a disk, so as to define an expanded top end of the post 36.

A stop block 33 extends from the circular wall 39, preferably in a radial direction, to the post 36 to bridge between the circular wall 39 and the post 36.

A resilient plate 34 is formed on the inclined face 32 immediately adjacent to one side of the stop block 33 by cutting a slit around the plate 34 to form a cantilever structure so that the plate 34 has a free end closest to the stop block 33 and resiliently moveable relative to the inclined face 32 and the stop block 33 in a cantilever manner. The resilient plate 34 has a side lug 341 formed on the free end of the resilient plate 34 and radially extending toward the post 36. A recessed notch 35 is formed the vertical face 31 to correspond to the side lug 341 for limiting the downward movement of the resilient plate 34 relative to the inclined face 32. The side lug 341 of the resilient plate 34 has a portion radially extending beyond the notch 35 and defining at free end thereof an inverted L-shaped configuration 342 which serves as a catch of which the function will be further described.

Figure 3:
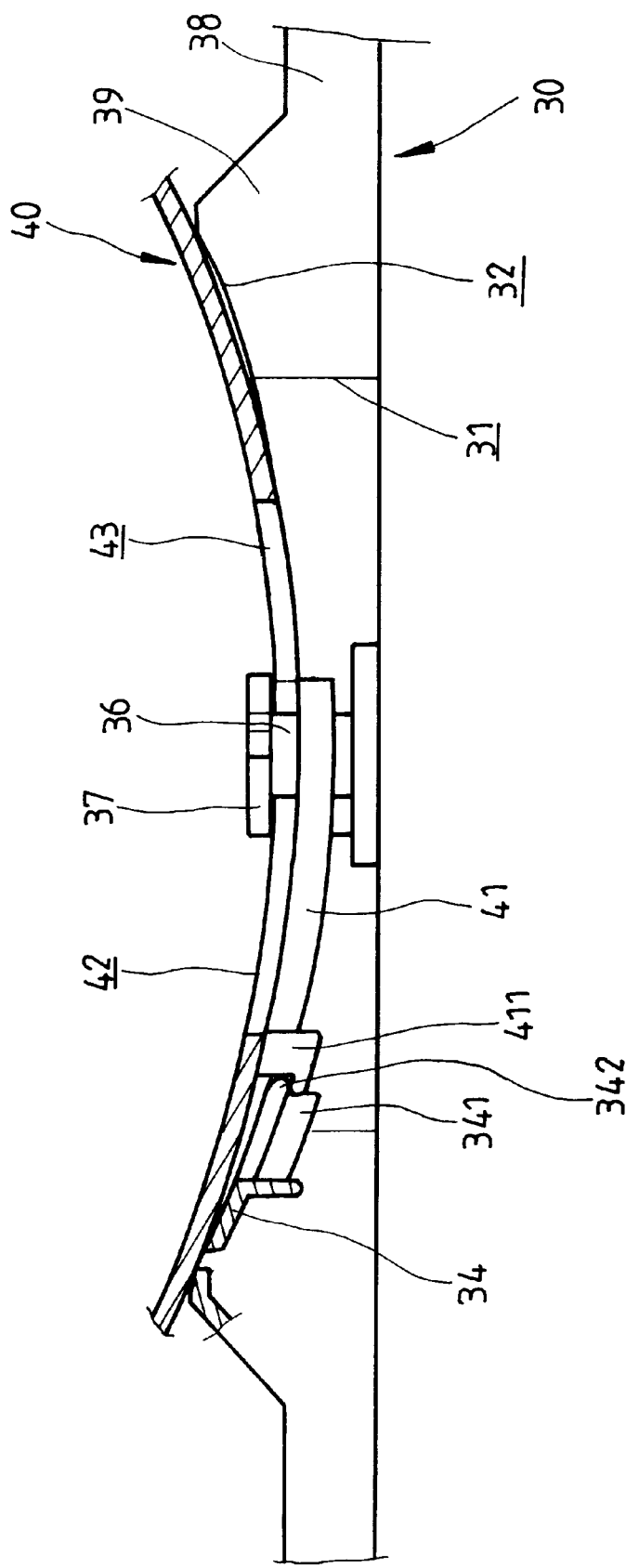
FIG. 3 is a partially cross-sectional view showing engagement between the paw and catch of the swivel base.
Figure 4:
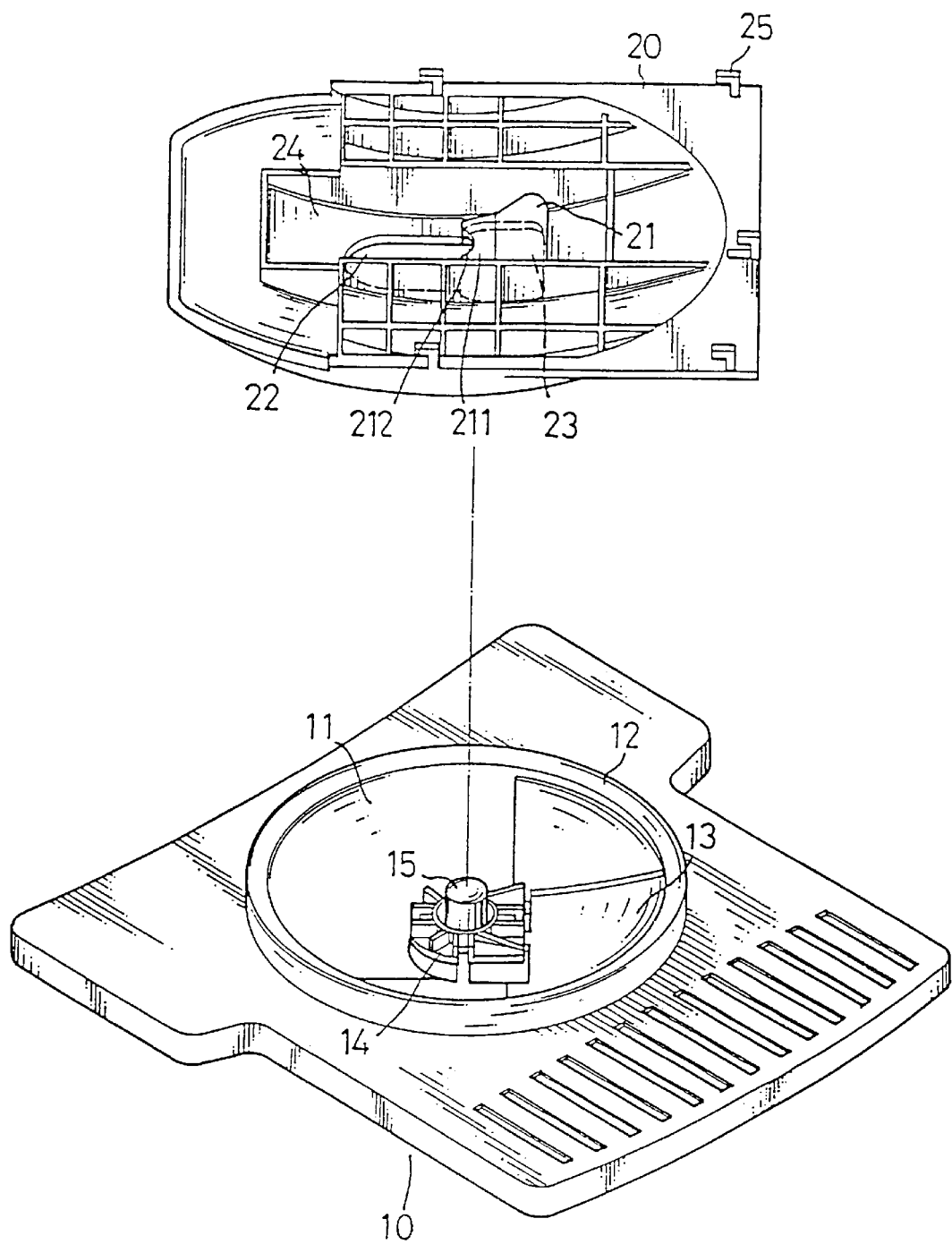
FIG. 4 shows an exploded perspective view of a prior art two-piece swivel base.

Referring to FIGS. 1, 3 and 4, the movable tray 40 comprises a plate body 44 having a central concave section 45 substantially corresponding in curvature to the inclined face 32 of the circular wall 39 of the bottom support 30. In other words, the concave section 45 is a portion of a sphere substantially corresponding to the that defining the inclined face 32 so as to allow the concave section 45 to be slidably supported on the ring-like inclined face 32 of the circular wall 39.

On the concave section 45 of the movable tray 40, an elongated slot 42 preferably extending from a center of the concave section 45 in a direction along a great circle of the sphere defining the concave section 45 and having a predetermined length is provided. The slot 42 has a width that is measured in a direction perpendicular to the length thereof smaller than an outside dimension of the retaining member 37, but larger than an outside dimension of the post 36 so as to be able to receive the post 36 therein. The slot 42 also has a widened section 43 which has a width substantially corresponding to or slightly greater than the outside dimension of the retaining member 37 so as to allow the retaining member 37 to insert therethrough. Arc sections 421 are provided to joint the side edges of the widened section 43 to the slot 42. The concave section 45 of the movable tray 40 also has a rib 41 formed on the underside thereof. An L-shaped end section 411 is provided on an end of the rib 41 to serve as a paw to be corresponding to the catch 342 of the resilient plate 34. The paw 411 will be further described.

In mounting the movable tray 40 to the stationary bottom support 30, the retaining member 37 is inserted through the widened section 43 of the slot 42 from the underside of the movable tray 40 to allow the concave section 45 to be supported on the inclined face 32. The rib 41 and the paw 411 are so dimensioned and arranged that when the concave section 45 of the movable tray 40 is brought into contact with the inclined face 32 of the circular wall 39, the paw 411 of the rib 41 contacts and depresses the side lug 341 of the resilient plate 34 to force the side lug 341 to move into the notch 35. The movable tray 40 is then moved, under the guidance of the slot 42, relative to the stationary bottom support 30 with the sliding engagement between the underside of the concave section 45 of the movable tray 40 and the inclined face 32 of the wall 39 of the stationary bottom support 30 to have the post 36 moving along and into the slot 42. This allows the movable tray 40 to be movable and rotatable relative to the stationary bottom support 30.

Once the movable tray 40 is moved relative to the stationary bottom support 30 to have the post 36 get into the slot 42 of the concave section 45 of the movable tray 40, the rib 41 loses contact engagement with the side lug 341 of the resilient plate 34 so that the resilient plate 34 springs back to the original position where the side lug 341 limits the movement of the rib 41 of the movable tray 40 into the notch 35 and thus prevents the movable tray 40 from accidently disengaging from the stationary bottom support 30.

The function of the catch 342 of the resilient plate 34 and the paw 411 of the rib 41 is that they are designed to engage each other once an individual intends to disengage the movable tray 40 from the bottom support 30 by radially moving the movable tray 40 relative to the post 36 to have the paw 411 approaching the catch 342. At the ultimate position, the paw 411 is engaged by the catch 342 and further radial movement of the movable tray 40 relative to the bottom support 30 is prohibited. Further, the engagement between the L-shaped paw 411 and the inverted L-shaped catch 342 prohibits the tray 40 from axially moving relative to the post 34 so as to prevent disengagement of the movable tray 40 from the bottom support 30.

Further, the rib 41 is arranged to get into contact with the stop block 33 during the rotation of the movable tray 40 about the post 36 to limit the rotation of the movable tray 40 relative to the stationary bottom support 30 so that the movable tray 40 is allowed to rotate at most approximately 360 degrees in either clockwise direction or counterclockwise direction.

Those skilled in the art will readily recognize that various modifications of the present invention may be made without departing the scope of the present invention defined in the appended claim. Accordingly the preferred embodiment illustrated and discussed herein should be understood to be exemplary only in nature and the scope of the instant invention should be limited only by the following claims.

What is claimed is:

1. A swivel base structure comprising a bottom support adapted to be placed on a surface and a movable tray movably supported on the bottom support and adapted to support thereon an article to be swivelled, the bottom support comprising a raised circular wall defining therein a recess with a post extending therefrom at a center of the recess defined by the circular wall, the circular wall having a ring-like inner inclined face which is concave to be corresponding to a ring segment of a sphere having a given radius and a substantially vertical face connecting between the inclined face and bottom of the recess, the post having an expanded retaining member formed thereon, a slit being formed on the inclined face to define a resilient, cantilever type member which has a free end having a side lug extending therefrom toward the post and partially into the recess, the side lug being elastically deformably moveable relative to the inclined face, the movable tray comprising a concave member corresponding to a portion of a sphere having the substantially same radius of the sphere defining the inclined face of the wall to be supported on the inclined face of the wall, the concave member having an elongated slot formed thereon with a width smaller than the retaining member but larger than the post, the slot having a widened section having a width sufficient to receive the retaining member therethrough to allow the post to move along the slot and allow the movable tray to rotate about the post, a rib being provided on an underside of the concave section of the movable tray so that when the movable tray is supported on the inclined face of the bottom support, the rib elastically deforms the side lug of the resilient member downward to define a passage for allowing the rib to slide over the resilient member and into the recess, the side lug of the resilient member having formed thereon an inverted L-shaped catch and the rib of the movable tray having an L-shaped paw corresponding to and engageable by the inverted L-shaped catch to prevent the movable tray from disengaging from the bottom support.

2. The swivel base structure as claimed in claim 1, wherein the recess defined by the circular wall comprises a stop block mounted therein to be contactable by the underside rib of the movable tray to limit the rotation of the movable tray about the post.

\* \* \* \* \*